United States Patent [19]
Andre

[11] Patent Number: 6,000,687
[45] Date of Patent: Dec. 14, 1999

[54] ACTUATOR FOR HYDRAULIC TOOL HOLDER

[75] Inventor: William M. Andre, Rochester Hills, Mich.

[73] Assignee: Hydra-Lock Corporation, Mt. Clemens, Mich.

[21] Appl. No.: 09/196,095

[22] Filed: Nov. 19, 1998

[51] Int. Cl.[6] .................................................. B23Q 3/08
[52] U.S. Cl. .............................................. 269/22; 269/27
[58] Field of Search .............................. 60/481; 269/22, 269/47, 27, 33, 157, 267, 900; 279/4.03

[56] References Cited

U.S. PATENT DOCUMENTS

| | | | |
|---|---|---|---|
| 2,938,346 | 5/1960 | Gratzmuller | 60/481 |
| 3,299,633 | 1/1967 | Cass | 60/481 |
| 5,441,284 | 8/1995 | Mueller et al. | 279/4.03 |
| 5,516,243 | 5/1996 | Laube | 279/4.03 |
| 5,556,114 | 9/1996 | Fabris | 279/4.03 |

*Primary Examiner*—David A. Scherbel
*Assistant Examiner*—Daniel G. Shanley
*Attorney, Agent, or Firm*—Reising, Ethington, Barnes, Kisselle, Learman & McCulloch, P.C.

[57] ABSTRACT

A hydrostatic holding device has a first actuator constructed to increase the pressure of a hydraulic fluid within a pressure chamber to urge a metal sleeve into firm engagement with a workpiece received in a hydrostatic sleeve and a second actuator constructed to relieve the high pressure within the system to permit the workpiece to be removed from the sleeve when desired. Preferably, the first and second actuators are separate cylinders each having pistons displaceable by separate actuating rods to conveniently achieve the increased pressure needed to firmly hold the workpiece and the bleeding or relieving of the pressure so that the workpiece can be removed from a holder. A check valve downstream of the first actuator prevents reverse flow of the hydraulic fluid from downstream of the check valve back into the first actuator and thereby permits the increased pressure to be maintained independently of the first actuator. A second valve adjacent the second actuator prevents the flow of hydraulic fluid from the pressure chamber to the second actuator until it is opened by the second actuator to permit such flow and thereby relieve the pressure in the pressure chamber and refill and recharge the first actuator.

11 Claims, 2 Drawing Sheets

ACTUATOR FOR HYDRAULIC TOOL HOLDER

FIELD OF THE INVENTION

This invention relates generally to workpiece or tool holders and more particularly to hydrostatic holding devices.

BACKGROUND OF THE INVENTION

Hydrostatic tool holders, such as that disclosed in U.S. Pat. No. 5,516,243 have been used to clamp or hold workpieces or work tools within a sleeve which is urged into engagement with the workpiece by a hydraulic or hydrostatic pressure acting on the sleeve. Such hydrostatic holding devices are useful to accurately, repeatably and securely hold a workpiece or work tool and therefore have had great commercial success. The hydraulic pressure which urges the sleeve into engagement with a workpiece or work tool is supplied by an external hydraulic source or by rotation of a screw disposed in a passage filled with a hydraulic fluid to compress the hydraulic fluid and thereby increase its pressure.

One prior application for a hydrostatic holding device is to hold a workpiece carried by a pallet of a conveyor to successive work stations whereat the workpiece is subjected to successive machining operations. To firmly hold the workpiece, an external hydraulic source is connected to the hydrostatic holding device to provide the pressurized hydraulic fluid which urges a sleeve into engagement with the workpiece. After a sufficient pressure is achieved within the hydrostatic device, the hydraulic source is disconnected from the holding device. The workpiece firmly clamped in the hydrostatic device is then moved on a pallet of a conveyor to the various work stations. After the workpiece has been formed, a hydraulic reservoir must be connected to the hydrostatic holding device to bleed the pressurized fluid from the device and thereby relax the sleeve to permit the workpiece to be removed from the holding device. This process is repeated for each workpiece and while functional, is inefficient, time consuming and labor intensive.

SUMMARY OF THE INVENTION

A hydrostatic holding device has a first actuator constructed to increase the pressure of a hydraulic fluid within a pressure chamber to urge a metal sleeve into firm engagement with a workpiece received in a hydrostatic sleeve and a second actuator constructed to relieve the high pressure within the system to permit the workpiece to be removed from the sleeve when desired. Preferably, the first and second actuators are separate cylinders each having pistons displaceable by separate actuating rods to conveniently achieve the increased pressure needed to firmly hold the workpiece and the bleeding or relieving of the pressure so that the workpiece can be removed from a holder. A check valve downstream of the first actuator prevents reverse flow of the hydraulic fluid from downstream of the check valve back into the first actuator and thereby permits the increased pressure to be maintained independently of the first actuator. A second valve adjacent the second actuator prevents the flow of hydraulic fluid from the pressure chamber to the second actuator until it is opened by the second actuator to permit such flow and thereby relieve the pressure in the pressure chamber.

Preferably, a fluid bypass passage communicates the first actuator with the second actuator and a third valve disposed in this passage permits fluid flow only from the second actuator to the first actuator. When the second actuator opens the second valve to relieve the pressure of the fluid in the chamber, there is a fluid flow through the second valve, the bypass passage and the third valve to reset the first actuator and replenish its hydraulic fluid supply.

Desirably, such a hydrostatic workpiece holder may be disposed on a pallet of a conveyor which carries the workpiece to successive work stations for machining the workpiece. At a first station, a ram of a hydraulic cylinder, press or other power source may displace the actuating rod of the first actuator to increase the pressure within the pressure chamber and thereby urge the hydrostatic sleeve into firm engagement with the workpiece. The first and second valves maintain the increased pressure in the hydraulic chamber and thus, the conveyor may move the workpiece from station to station without a loss in chamber pressure even though the actuating rod of the first actuator is not being held in place or acted on by an external source. After the workpiece has been machined at the various work stations, the conveyor moves the pallet to a final position wherein a ram of another power source (or even the first source) displaces the actuating rod of the second actuator to displace its piston and thereby open the second valve to relieve the pressure in the pressure chamber and to simultaneously reset the first actuator with the fluid flow through the third valve and into the first actuator. Thus, the hydrostatic holding device according to the present invention provides a unique, self-contained and simple to operate hydrostatic holder which does not require an external hydraulic power source to supply hydraulic fluid to the system nor an external hydraulic fluid reservoir to receive hydraulic fluid.

Objects, features and advantages of this invention include providing an improved hydrostatic holding device which firmly holds and accurately and repeatedly aligns a workpiece, facilitates providing a pressurized hydraulic fluid to firmly hold the workpiece, facilitates relieving the pressure of the hydraulic fluid to permit removal of the workpiece, may be conveniently carried on a pallet of a conveyor, can be automatically as opposed to manually operated, provides a reserve supply of hydraulic fluid in case of a system leak, may be provided with an accumulator to ensure sufficient pressure of the hydraulic fluid even with some leakage, is of relatively simple design and economical manufacture and assembly and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
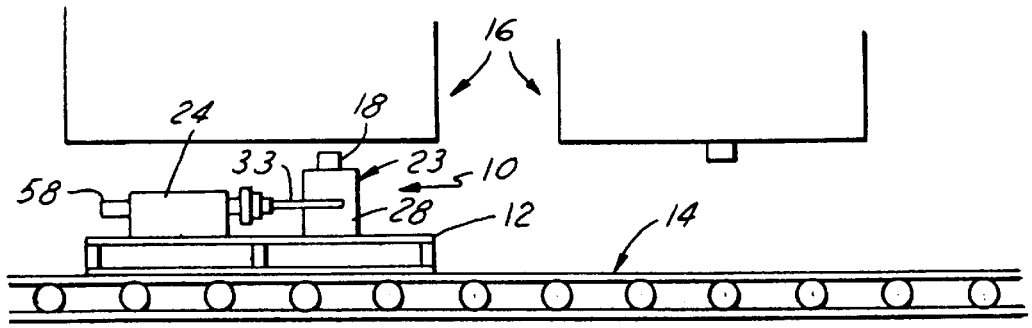
FIG. 1 is a diagrammatic view of a conveyor carrying a pallet having a hydrostatic holding apparatus embodying the invention.

Referring in more detail to the drawings, FIG. 1 illustrates a hydrostatic holding device 10 received on a pallet 12 of a conveyor 14. The conveyor 14 moves the pallet 12 and holding device 10 to a plurality of work stations 16 for successive machining operations on a workpiece 18 received in the holding device 10. The hydrostatic holding device 10 securely holds and accurately and repeatably aligns workpieces 18 as they are moved to successive work stations 16.

Figure 2:
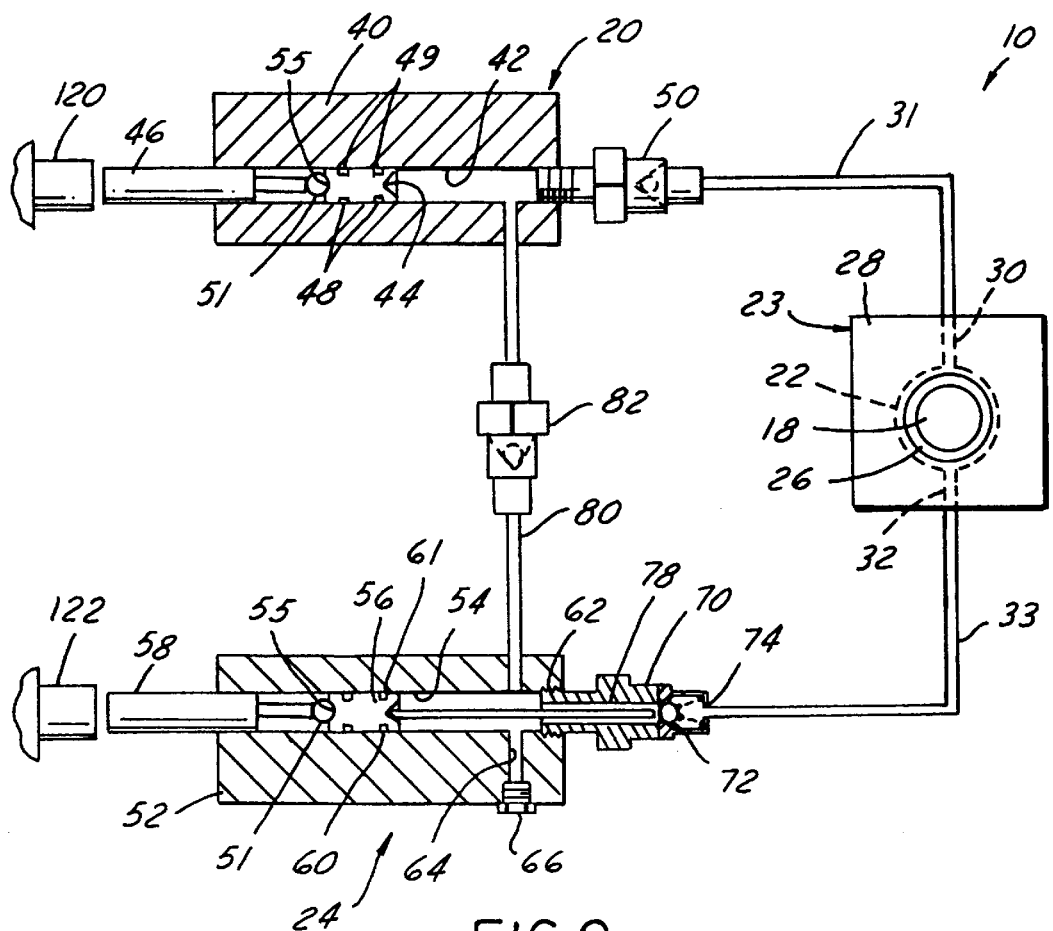
FIG. 2 is a schematic view of a hydrostatic holding apparatus embodying the invention.
Figure 3:
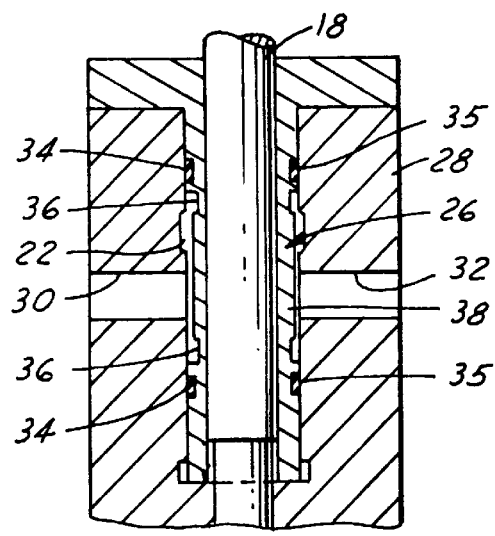
FIG. 3 is a fragmentary sectional view of a pressure chamber and hydrostatic sleeve holding a workpiece.

As shown in FIGS. 2 and 3, the hydrostatic holding device 10 has a first actuator 20 for increasing the pressure within a hydraulic pressure chamber 22 of a workpiece holder 23 and a second actuator 24 for relieving the pressure within the hydraulic pressure chamber 22. The hydraulic chamber 22 is annular and defined between a hydrostatic sleeve 26 and a body 28 of the holder 23 which surrounds the sleeve 26. Passages 30, 32 through the body 28 communicate the pressure chamber 22 with the first actuator 20 and the second actuator 24, respectively, through suitable pipes 31, 33. The entire system including the first actuator 20, second actuator 24, pressure chamber 22 the passages 30, 32, and pipes 31, 33 are constructed to be substantially completely filled with a substantially incompressible fluid such as a heavy duty grease, oil or other suitable hydraulic liquid.

As shown in FIG. 3, the hydrostatic sleeve 26 has a pair of outer, annular grooves 34 each constructed to receive a sealing member, such as an 0-ring 35, to prevent leakage of fluid from the pressure chamber 22 externally of the hydrostatic sleeve 26. A pair of annular grooves 36 formed inwardly of the outer grooves 34 weaken the metal sleeve 26 to facilitate the flexing or radial contracting of the sleeve 26 under an increased hydrostatic pressure within the pressure chamber 22 into firm engagement with a workpiece 18 slidably received in the sleeve. A reduced diameter mid portion 38 of the hydraulic sleeve between the inner grooves 36 defines in part the pressure chamber 22.

The first actuator 20 has a body 40 with a through bore 42 in which a piston 44 is slidably received for reciprocation and may be advanced by an actuating rod 46. The piston 44 preferably has one or more annular grooves 48 formed in its periphery and constructed to receive a wiper or sealing member 49 to prevent leakage of the fluid from the first actuator 20. Preferably, to compensate for any misalignment, a ball bearing 51 is preferably disposed between the piston and the end face of the actuating rod 46 and rotatably received in a complimentary semispherical pocket 55 in the adjacent end face of the piston 44.

A first check valve 50 disposed downstream of the first actuator 20 prevents the reverse flow of fluid from downstream of the check valve 50 back into the first actuator 20. The check valve 50 may be of substantially any configuration and preferably operates to prevent such reverse fluid flow to the first actuator 20 under pressures up to 10,000 psi or more.

The second actuator 24 has a body 52 with a generally cylindrical through bore 54 in which a piston 56 is slidably received for reciprocation and may be advanced by an actuating rod 58 which bears on a ball bearing 51 received in a semispherical pocket 55 in the piston 56. The piston preferably has one or more annular grooves 60 formed about its periphery and constructed to receive a wiper or a sealing member 61 to prevent leakage of the fluid from the second actuator 24. An actuating pin 62 extends from the piston 56 for co-movement therewith. A fill passage 64, which in use is closed by a plug 66, is provided to permit additional fluid to be added to the system.

A valve 70 prevents fluid flow from the pressure chamber 22 to the second actuator 24 when it is closed. The valve 70 preferably has a ball 72 yieldably biased by a spring 74 onto a valve seat 76 surrounding a valve opening 78. To open the valve 70, the actuating rod 58 of the second actuator 24 is advanced into the bore 54 to move the piston 56 and the pin 62 until the pin displaces the ball 72 from the valve seat 76 to permit fluid flow around the ball 72 and through the valve passage 78.

To permit fluid flow from the second actuator 24 to the first actuator 20 to thereby reset the first actuator 20 without the need for supplying additional fluid into the system, a connecting bypass passage 80 is provided between the first actuator 20 and the second actuator 24. A second check valve 82 disposed within the connecting passage 80 prevents fluid flow from the first actuator 20 to the second actuator 24 while permitting a relatively free-flow of fluid from the second actuator 24 to the first actuator 20. As shown in FIG. 2, the connecting passage 80 preferably communicates with the second valve 70 through the bore 54 of the second actuator 24.

In a second embodiment, a valve 70' (shown diagrammatically in FIG. 4) may be constructed to open when a sufficient fluid pressure exists in the bore 54. No pin 62 is needed with this type of valve. Rather, when the piston 56 is displaced an increased hydraulic pressure is generated in the bore 54 tending to open the valve 70'.

Figure 4:
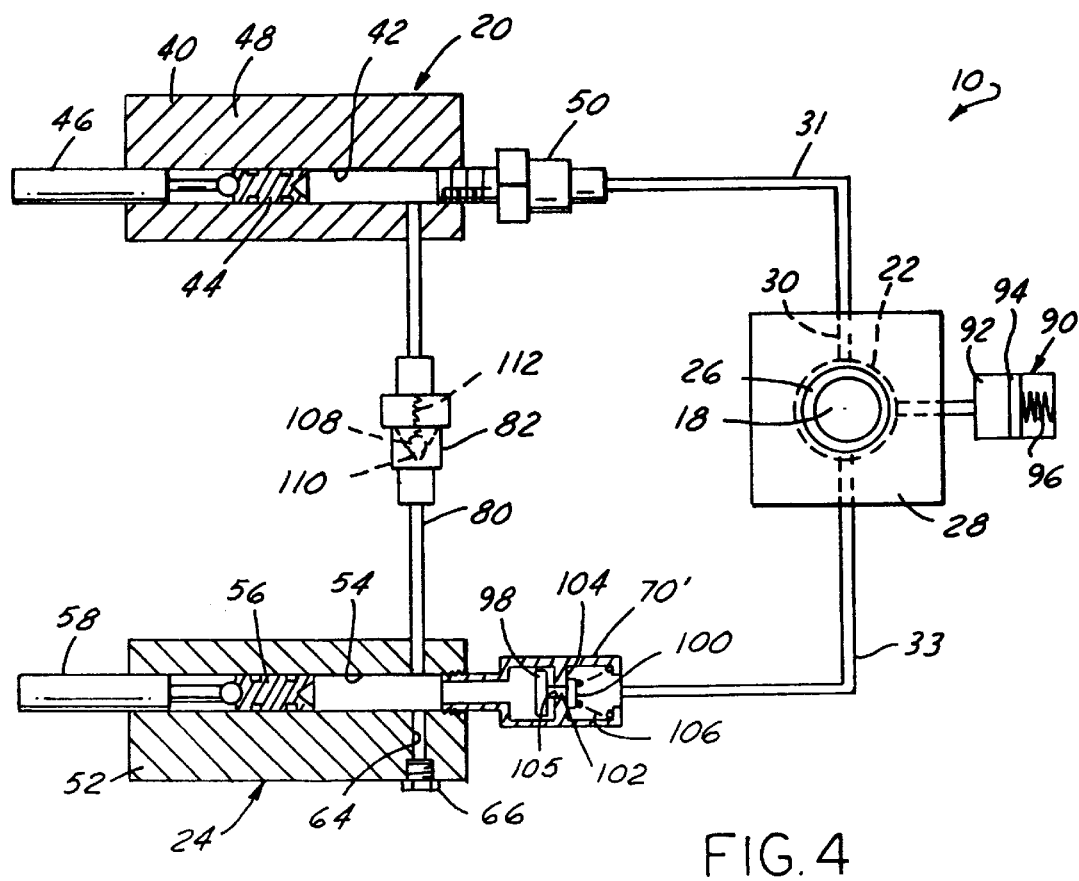
FIG. 4 is a schematic view of another hydrostatic holding apparatus embodying this invention and having an accumulator.

In one embodiment of the valve 70', as shown in FIG. 4, an enlarged valve head 98 is interconnected with a smaller valve head 100 by a valve stem 102. The valve head 100 is constructed to engage a valve seat 104 to close a valve passage 105 and prevent fluid flow through the valve 70' when the aggregate force on the valve head 100 is greater than the aggregate force on valve head 98. A spring 106 may be provided yieldably biasing the valve 70' into its closed position. Generally, the pressure of the fluid in the bore 54 acts on valve head 98 and in combination with the force of the spring 106, opposes the force acting on valve head 100 which is generated by the pressurized fluid in pipe 33. To ensure that a sufficient pressure of fluid can be generated in the bore 54 to displace valve head 98 from valve seat 104, the second check valve 82 preferably has a ball 108 biased onto a seat 110 by a spring 112 which provides force sufficient to maintain the second check valve 82 closed while the pressure in the bore 54 is increased to open the valve 70'. Nominally, the valve 70' may be constructed to open when the pressure in the bore 54 exceeds 200 psi and when closed, prevents fluid flow into the bore 54 at pressures up to 10,000 psi or more. Such a valve 70' is commercially available from Circle Seal under the model name or number MD 9459B-2PP-2.

When the valve 70' is opened, the high pressure fluid in the pipe 33 flows into the bore 54 and increases the pressure therein until a threshold pressure is reached in the bore 54 which is sufficient to displace the ball 108 of the second check valve 82 from its seat 110. Fluid may then flow through the second check valve 82 and into the first actuator 20 to reset it. Upon displacement of the actuating rod 46 of the first actuator 20, the pressure in the bore 42 will tend to close the second check valve 82 if not already closed and increase the pressure downstream of the first check valve 50. The increased pressure in pipe 33 will close the valve 70' to permit the build-up of pressure in the pressure chamber 22.

If desired, as shown in FIG. 4, an accumulator 90 may be provided in communication with the pressure chamber 22 to ensure sufficient fluid pressure exists in the pressure chamber 22 to firmly hold the workpiece 18 even if there is some fluid leakage from the system. The accumulator 90 preferably has an accumulation chamber 92 to receive a quantity of fluid and a piston 94 yieldably biased by a spring 96 to act on the fluid in the accumulation chamber 92. When the fluid is sufficiently pressurized to displace the piston 94, the spring 96 sets the system pressure. Other accumulator constructions may also be used to maintain a sufficient pressure in the system to firmly hold a workpiece 18 even with some fluid loss from the system.

Operation

In use, to firmly and releasably hold a workpiece 18 with a portion disposed within the hydrostatic sleeve 26, a ram of a hydraulic press, a cylinder or some other external prime mover 120, advances the actuating rod 46 of the first actuator 20 thereby advancing the piston 44 and pushing fluid within the bore 42 through the first check valve 50 which prevents the reverse flow of fluid therethrough. The pressure downstream of the check valve 50 increases and is maintained by both the first check valve 50 and the valve 70 which capture the fluid between them. When the pressure within the pressure chamber 22 is sufficiently increased, the hydrostatic sleeve 26 is urged radially inward into firm engagement with the workpiece 18 received in the sleeve 26. The substantially uniform pressure within the pressure chamber 22 substantially uniformly flexes or radially contracts the sleeve 26 to finely hold and accurately and repeatably align successive workpieces 18 within the sleeve 26. With the workpiece 18 firmly clamped within the hydrostatic sleeve 26, the prime move 120 is retracted and the conveyor 14 may be advanced to carry the pallet 12 and the hydrostatic holding device 10 with the workpiece 18 clamped therein to successive work stations 16 to form the workpiece 18.

When it is desired to release the workpiece 18 from the hydrostatic sleeve 26, the pallet 12 is moved to a final station wherein a ram of an external prime mover 122 is advanced to advance the actuating rod 58 of the second actuator 24 and hence, its piston 56. Advancement of the piston 56 moves the pin 62 towards the ball 72 until the pin 62 displaces the ball 72 from the valve seat 76 and permits fluid flow through valve 70 thereby relieving the pressure from within the pressure chamber 22. The reduction of the pressure in the pressure chamber 22 permits the sleeve 26 to relax and return to its original, unflexed state so that the workpiece 18 is released and can be removed from the device 10.

The advancement of the piston 56 to open the valve 70 also displaces the fluid within the bore 54 of the second actuator 24 through the connecting bypass passage 80, the second check valve 82 and into the bore 42 of the first actuator 20. When the valve 70 is opened, at least a portion of the fluid that flows through the valve 70 and into the bore 54 also enters the connecting passage 80, flows through the second check valve 82 and enters the bore 42 of the first actuator 20. This return of fluid to the first actuator 20 displaces and retracts its piston 44 and actuating rod 46 to reset the first actuator 20 so that it may be subsequently advanced to increase the pressure in the system to hold a subsequent workpiece 18. The volume of fluid maintained in the bore 54 of the second actuator 24 and in the connecting bypass passage 80 provides a small reservoir of fluid which may be delivered to the first actuator to replenish it if there is a small leak or other loss of fluid in the system.

Thus, the hydrostatic holding device 10 according to the present invention facilitates securely holding and accurately and repeatably aligning one at a time each of a plurality of workpieces 18 within a hydrostatic sleeve 26 of the workpiece holder 23. The hydrostatic holding device 10 is a self-contained system which facilitates increasing the pressure of the fluid within the hydraulic chamber 22 and also relieving that pressure without the need for an external hydraulic source or an external fluid reservoir. The device 10 provides a small reservoir of fluid to accommodate some fluid loss within the system and may be actuated by simply displacing an actuating rod 46 or 58 to increase the pressure and relieve the pressure within the system. Further, the device 10 is of extremely simple design to facilitate manufacture, assembly and maintenance of the device 10.

What is claimed is:

1. A hydrostatic holding device comprising:

a first actuator having a bore constructed to receive a hydraulic fluid, a piston received in the bore to displace the hydraulic fluid and an actuating rod constructed to displace the piston;

a first valve downstream of the first actuator and constructed to permit fluid flow out from the first actuator and to prevent fluid flow into the first actuator through the first valve;

a second actuator having a bore constructed to slidably receive a piston and an actuating rod constructed to displace the piston received in the bore of the second actuator;

a second valve disposed between the first valve and the second actuator and constructed to prevent fluid flow into the second actuator when closed and to permit such flow when open;

a connecting passage communicating the bore of the first actuator with the second valve;

a third valve disposed in the connecting passage and constructed to prevent fluid flow therethrough from the bore of the first actuator and to permit fluid flow therethrough to the bore of the first actuator through the connecting passage;

a body defining in part a fluid chamber in communication with the first actuator through the first valve and the second actuator through the second valve and constructed to receive a fluid under pressure; and a hydrostatic sleeve carried by the body and responsive to the pressure of the fluid in the fluid chamber to releasably hold a workpiece whereby movement of the actuating rod of the first actuator to advance the piston therein displaces hydraulic fluid through the first valve and increases the pressure downstream of the first valve and in the fluid chamber to clamp a workpiece in the hydrostatic sleeve and displacement of the actuating rod of the second actuator controls the opening of the second valve to permit fluid flow therethrough and through the connecting passage and thereby reduces the pressure in the fluid chamber to release and permit removal of the workpiece from the hydrostatic sleeve.

2. The device of claim 1 which also comprises an actuating pin received in the bore of the second actuator and displaceable by the piston in the bore of the second actuator and wherein the second valve has a valve head yieldably biased onto a valve seat to close a valve opening and, when advanced, the actuating pin is received through the valve opening and bears on the valve head to displace it from the valve seat and permit fluid flow through the valve opening.

3. The device of claim 1 wherein the second valve is moved from its closed position to its open position by a fluid pressure acting on the valve and generated by displacement of the actuating rod and piston of the second actuator.

4. The drive of claim 1 wherein the second actuator is constructed to contain hydraulic fluid and the connecting passage also communicates with the bore of the second actuator downstream of the second valve.

5. The device of claim 1 wherein the fluid chamber is generally annular, circumferentially continuous and is defined between the body and the hydrostatic sleeve.

6. The device of claim 1 which also comprises a pallet, the actuators, valves and body are carried by the pallet and a conveyor constructed and arranged to move the pallet.

7. The device of claim 1 which also comprises an accumulator in communication with the fluid chamber.

8. A hydrostatic holding device comprising:

a body;

a hydrostatic sleeve carried by the body;

a fluid chamber defined between the body and the hydrostatic sleeve and constructed to contain a fluid under pressure;

a first actuator for increasing the pressure in the fluid chamber;

a second actuator for reducing the pressure in the fluid chamber;

a first valve downstream of the first actuator and upstream of the fluid chamber and constructed to prevent fluid flow therethrough into the first actuator;

a second valve between the fluid chamber and the second actuator constructed to selectively permit fluid flow therethrough to the second actuator; and a connecting passage which communicates the second valve when open with the first actuator.

9. The device of claim 8 wherein the connecting passage communicates with the second valve through the second actuator.

10. The device of claim 8 wherein the first actuator has a body with a bore formed therein, a piston slidably received in the bore and an actuating rod constructed to advance the piston to increase the pressure in the fluid chamber.

11. The device of claim 8 wherein the second actuator has a body with a bore formed therein, a piston slidably received in the bore and an actuating rod constructed to advance the piston to open the second valve to decrease the pressure in the fluid chamber and reset the first actuator.

* * * * *